Oct. 17, 1967  H. LEISTRITZ  3,347,040
APPARATUS FOR A NONCATALYTIC AFTERBURNING OF EXHAUST
GASES OF INTERNAL COMBUSTION ENGINES
Original Filed Oct. 6, 1965  7 Sheets-Sheet 4

(a-a)

Inventor:
HANSKARL LEISTRITZ
by Otto John Munz
Attorney

United States Patent Office 3,347,040
Patented Oct. 17, 1967

3,347,040
APPARATUS FOR A NONCATALYTIC AFTER-BURNING OF EXHAUST GASES OF INTERNAL COMBUSTION ENGINES
Hanskarl Leistritz, 49 Reichenhaller Str., 8228 Freilassing, Germany
Continuation of application Ser. No. 493,479, Oct. 6, 1965. This application Sept. 27, 1966, Ser. No. 582,460
Claims priority, application Germany, Oct. 8, 1964, L 48,975; Jan. 11, 1965, L 49,693; July 26, 1965, L 51,220
26 Claims. (Cl. 60—30)

ABSTRACT OF THE DISCLOSURE

The efficiency of non-catalytic afterburners for the exhaust gases of internal combustion engines is improved by arranging at least one vibration reflecting wall between two afterburning units housed in a common shell. This improves the thermal conditions.

A throttle flap in the intake conduit of the internal combustion engine and controlled in response to the temperature of the afterburning apparatus is operatively connected to the main control valve in the intake conduit of the combustion engine to open and close in unison therewith. Hereby an extinction of the afterburner is prevented under partial-load conditions and when the motor speed changes.

*Crossreferences to related applications*

The present application is a continuation of applicant's U.S. application Ser. No. 493,479, filed Oct. 6, 1965, and co-pending on the filing date of the present application, to the filing date of which it is entitled, and priority is also claimed based on corresponding German patent applications Nos. L 48,975, filed Oct. 8, 1964, L 49,693, filed Jan. 11, 1965, and L 51,220, filed July 26, 1965.

This application is a continuation of my copending application Ser. No. 493,479 filed Oct. 6, 1965, now abandoned.

This invention relates to apparatus for a non-catalytic afterburning of the exhaust gases from internal combustion engines. Such afterburning apparatus have already been disclosed in the Belgian Patent 621,506 and the analogous French Patent 1,336,918 of the applicant. In these known apparatus, two or more afterburner units are accommodated in a common shell. Each of these afterburner units comprises an axial flow tube, which confines an unitary air admixing and combustion chamber. The upstream portion of this tube defines an inlet chamber and has separate inlet openings for exhaust gases and supplemental air. The downstream portion of the tube defines a combustion chamber and contains an igniter. Two vibration reflecting walls extending transversely to the axis of the tube are provided upstream and downstream, respectively, of the air admixing and combustion chamber. These walls ensure the formation of pressure wave vibration in the air admixing and combustion chamber to provide for a thorough mixing of the air and of the combustibles and to reduce the temperature required for ignition. The combustion chamber is continued by an extension, which serves for accommodating an increased flame when the internal-combustion engine is producing exhaust gases at a high rate. A heat exchanger having a common wall is provided between the exhaust gas supply pipe and the air admixing and combustion chamber and/or the extension of the combustion chamber and ensures that a high combustion temperature will be attained. Each afterburner unit comprises also sound-damping means.

The subdivision of the afterburning apparatus into two or more units has the advantage that the required combustion temperature can be attained in each unit faster than in a single, larger unit.

The smaller a three-dimensional structure, the larger is its surface area relative to its volume. In a smaller unit, a given heat quantity transferred per square centimeter of the surface of the common walls of the heat exchanger has a higher heating and cooling effect.

A damping of sound can be effected with much smaller expenditure in a plurality of relatively small units than with a single, relatively large unit. If the exhaust gases are distributed, e.g., to two units, one half of the cross-section of flow will be sufficient for a damping of sound. This requires less than one half of the structural expenditure so that savings result although sound damping means must be provided in each afterburner unit.

A distribution of the afterburning process to a plurality of combustion chambers is particularly desirable for the control of the flame and for a restriction in size of the explosion operations. When the afterburning begins from cold starting conditions with individual explosions and when the afterburning is not yet continuous but consists of chronologically overlapping explosions even when the internal-combustion engine is operating at a constant speed, the use of a plurality of combustion chambers will enable a control of each explosion. Two or more combustion chambers may be used, depending on the size of the engine. This applies both to the damping of sound and to the covering of flames. Flame shielding plates consisting usually of perforated plates having holes 1 mm. or less in diameter are ineffective in a red hot state. The reduction of the heat energy per combustion chamber facilitates the maintenance of flame-shielding plates below the temperature at which they are red hot.

So far, only the above-mentioned patents have so far disclosed an arrangement of a plurality of afterburner units with parallel axes. The present invention teaches to provide two afterburner units with vibration reflecting walls disposed upstream or downstream of the air admixing and combustion and air chambers and facing each other or with a common vibration reflecting wall which is downstream of the air admixing and combustion chambers.

This arrangement results mainly in thermal advantages. If the air admixing and combustion chambers are arranged so that their upstream reflecting walls are directly connected to each other or adjoin a common air inlet chamber, the heat radiations from both combustion and air chambers will meet in the air inlet zone and enable a faster heating of the air. Under steady-state thermal conditions, the supplemental air of each unit is constantly heated to a higher temperature. Experience has shown that a temperature of 400° C. must be attained as fast as possible in the air inlet chamber which serves for preheating. According to the invention, this is enabled by the mutually opposed heat radiations.

When the air admixing and combustion chambers are connected at their downstream vibration reflecting walls and have preferably a common wall, this wall or these walls are heated from both sides. As there is no path for an appreciable dissipation of heat, this wall or these walls form incandescent surfaces, which contribute to a rapid attainment and a subsequent maintenance of the required combustion temperature.

In a development of the invention, two or more afterburner units may be accommodated in a shell which consists of a ring tube. In this case, vibration reflecting walls disposed upstream and downstream of the air admixing and combustion chambers may face each other. The arrangement may be such that the upstream walls face each other and so do the downstream walls. In special cases, one downstream reflecting wall may adjoin an air inlet chamber and be disposed close to an upstream deflecting wall.

It is particularly desirable to establish a communication between the two air admixing and combustion chambers through an aperture in the vibration reflecting wall or walls. This applies to a common downstream reflecting wall as well as to the other arrangements which have been described, particularly when a common air inlet chamber is disposed between the two upstream reflecting walls.

In this arrangement, the air admixing and combustion chamber of one unit serves as a buffer chamber for the intermittent combustion operations performed in the other unit. The resulting combustion operations are less poppy and the expenditure of sound damping means may be reduced even compared to the arrangement of a plurality of afterburner units having air admixing and combustion chambers which do not communicate with each other.

The units might extend at an obtuse angle to each other. Such an arrangement may be suitable in special cases. It is particularly desirable, however, if the tube axes of both units are aligned because this arrangement results in a simple design.

If a common vibration reflecting wall is provided downstream from the air admixing and combustion chambers, the aperture through this wall may be utilized also for the ignition. A single igniter may be sufficient for two units and may be disposed in the aperture or in one of the units. In the latter case, the flame is projected through the aperture and ignites the combustible mixture in the other unit.

For connection to multicylinder internal-combustion engines, the afterburner units may have separate exhaust gas supply conduits and each afterburner unit may be connected to one group of cylinders of the internal-combustion engine. This arrangement renders the buffer system according to the invention particularly effective. As both afterburner units are supplied with exhaust gases at different times, there is also a time lag between the afterburning operations so that the pressure peaks of each air admixing and combustion chamber can be reduced by a flow through the aperture.

If there is a sufficiently large difference in size between the units, which are used in conjunction with an internal-combustion engine having, e.g., four cylinders, the exhaust gases from a single cylinder may be supplied to the small unit and the exhaust gases from all other cylinders may be supplied to the large unit. In this case, the small unit will operate at a lower frequency because it is supplied with exhaust cases only once in each cycle of the internal-combustion engine. A reduction in frequency will increase the ignitability of the exhaust gas-air mixture.

The smaller unit may serve as an igniter, particularly if the difference in size between the two units is large and the smaller unit is surrounded by heat insulation. During the starting of the internal-combustion engine, this igniter can rapidly be heated to the operating temperature and during idling and during a non steady-state operation of the internal-combustion engine it is much easier to maintain this igniter at the required operating temperature than the adjacent larger air admixing and combustion chamber.

The advantages afforded by the invention from the thermal aspect reside in a considerable reduction of the required volumes of the air admixing and combustion chambers. According to the patents referred to initially hereinbefore, the air admixing and combustion chambers are required to have a volume which is up to three times the total displacement volume of the internal-combustion engine. According to the invention, much smaller volumes are sufficient. The total cubic capacity of the air admixing and combustion chambers, inclusive of the flow reversing regions at the downstream vibration reflecting walls, may be smaller in this case than the total displacement volume of the internal-combsution engine.

Besides, the total cubic capacity of both air admixing and combustion chambers and of the extension or extensions of the combustion chambers as well as the reversing regions between them may be five to eight times the total displacement volume of the internal-combustion engine whereas the above-mentioned patents require a total cubic capacity which is eight to ten times the total displacement volume.

These savings in volume are enabled by the fact that the higher temperature level enables an afterburning of exhaust gases having a smaller proportion of combustibles and a smaller flame and smaller combustion chambers are sufficient for this purpose.

The above-mentioned patents describe that a damper in the intake conduit of the internal-combustion engine is controlled in response to the temperature of the afterburning apparatus. This facilitates particularly the ignition in the afterburning apparatus during the start of the internal-combustion engine from the cold. In a development of the present invention, the damper may be operatively connected to the main control valve of the internal-combustion engine to open and close in unison therewith. If mixture and particularly air is supplied at a low rate to the internal-combustion engine from the main control valve, the engine will generate only a small power and will produce exhaust gases only at a low rate. In this condition, the simultaneous reduction of the cross-section of flow at the damper causes an intake of fuel at a higher rate so that the fuel content of the exhaust gases is increased. In this way the risk of an extinction of the afterburner under partial-load conditions and in the case of a frequent speed change of the internal-combustion engine is eliminated.

Illustrative embodiments of the invention will now be described with reference to the accompanying drawings, in which FIGS. 1 to 3 are longitudinal sectional views showing different embodiments of afterburning apparatus according to the invention. Each of said apparatus comprises two afterburner units, which have a common vibration reflecting wall adjacent to their combustion chambers.

In all embodiments, the direction of flow of the incoming exhaust gases is indicated by solid-line arrows, the direction of flow of the supplemental air is indicated by dotted arrows and that of the outflowing afterburnt exhaust gases is indicated by dotted-line arrows.

Figure 1:
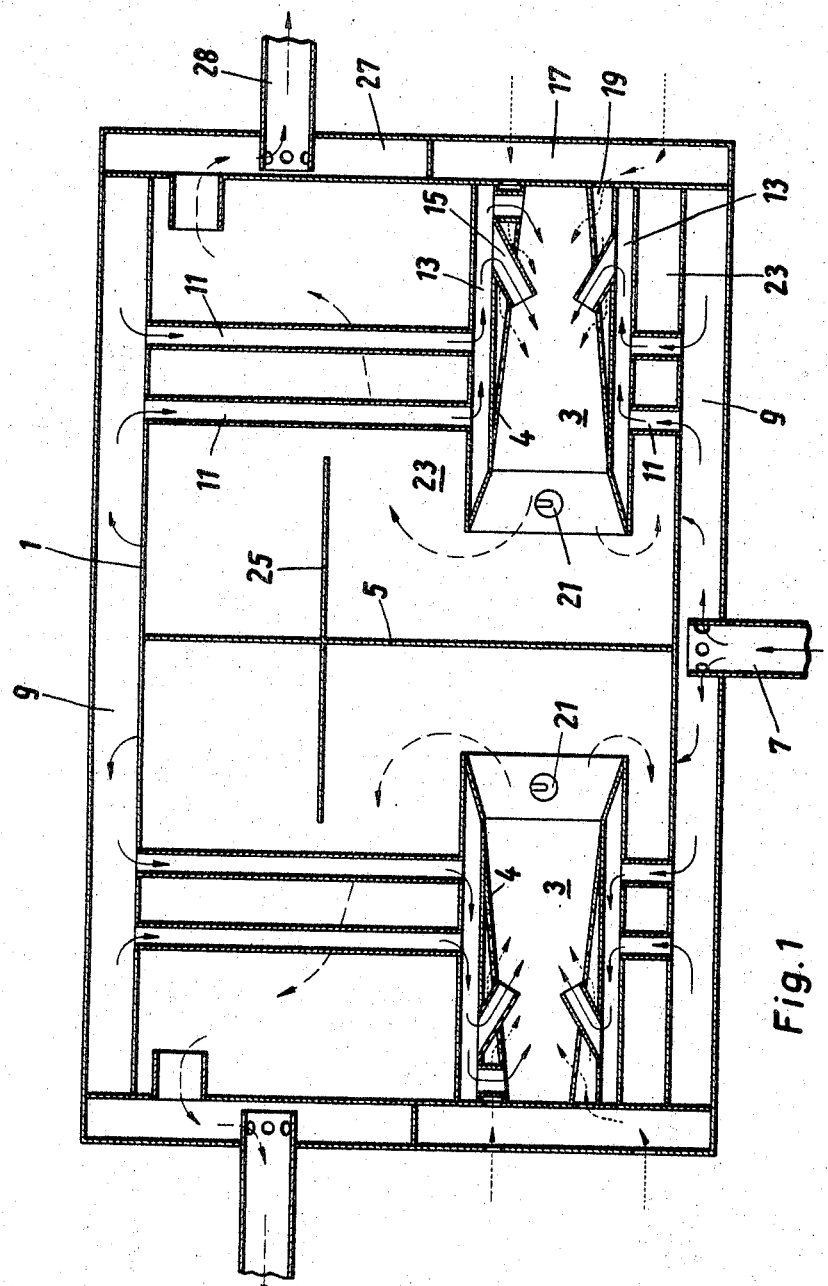

According to FIG. 1, two air admixing and combustion chambers 3 are so arranged in their tubes 4 that their downstream ends face each other. A wall 5 is disposed between them and serves as a vibration reflecting wall between the air admixing and combustion chambers 3. The exhaust gases from all cylinders of the internal-combustion engine flow through a duct 7 into a hollow-cylindrical chamber 9, which surrounds the shell 1. Ducts 11 lead from the chamber 9 to chambers 13 of the afterburner units. The chambers 13 communicate through ducts 15, which are inclined relative to the axis, to the tube 4, which surrounds the air admixing and combustion and chamber 3.

The supplemental air flows from the outside into a preheating chamber 17 associated with each unit and from chamber 17 into another air preheating chamber 19, which surrounds one end of tube 4. From chamber 19, the air flows into the air admixing and combustion chamber 3.

An igniting plug 21 is arranged at the downstream end of each air admixing and combustion chamber. The afterburnt exhaust gases are reversed at the wall 5 to enter the extension 23 of the combustion chamber. At the upper end in FIG. 1, this extension has approximately the width of the air admixing and combustion chamber. The extension is defined at the top by a wall 25. The afterburnt exhaust gases flow in the extension of the combustion chamber between the exhaust gas supply ducts 11 into an outer chamber 27 and from the latter into an outlet pipe 28.

The ducts 11 and the hollow-cylindrical chamber 9 form heat exchangers together with the extension 23 of the combustion chamber. The chamber 13 forms a heat exchanger together with a portion of the wall of the air admixing and combustion chamber 3 and with the preheating chamber 19 for supplemental air. The vibration reflecting wall 5 between the two afterburner units is adapted to be heated to incandescence, just as the downstream portion of the tube 4 and the wall 25.

Figure 2:
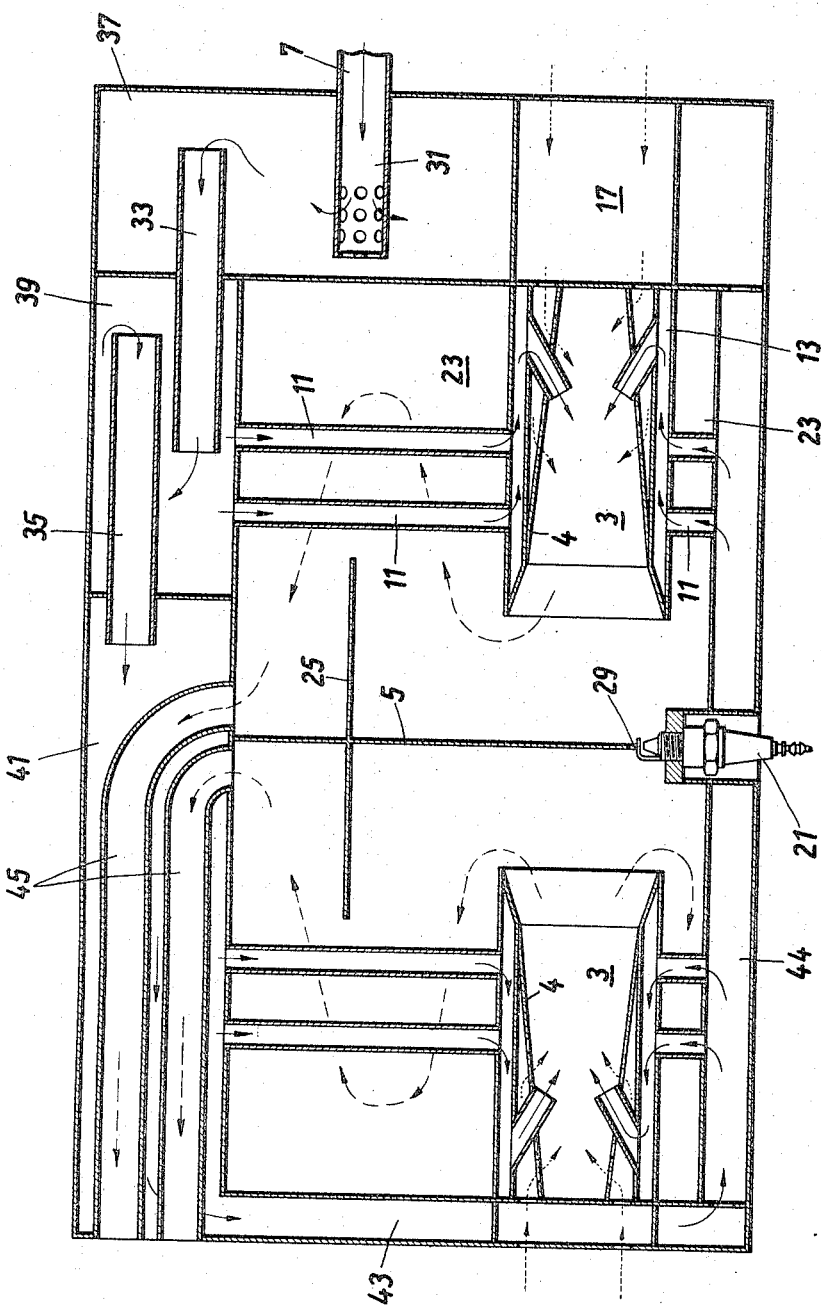

In FIG. 2, corresponding parts are provided with like reference characters, the vibration reflecting wall 5 has an aperture 29, which contains an igniting plug 21, which is common to both afterburner units. The aperture 29 permits of an equalization of pressure between the two afterburner units. The exhaust gas supply conduit contains sound damping means comprising an inlet spray head 31 and tubes 33 and 35, the ends of which overlap each other and the end of the spray head 31. The exhaust gases flow in series through chambers 37, 39, 41, 43 and 44 and just as in FIG. 1 enters the combustion and air chambers. Outlet ducts 45 for the afterburnt exhaust gases extend through the chamber 41. The heat exchangers described hereinbefore are also provided in this case. As the ducts 45 for the afterburnt exhaust gases extend through the chamber 41 through which the exhaust gases are supplied, the afterburnt exhaust gases are particularly effectively cooled before they escape into the open.

Figure 3:
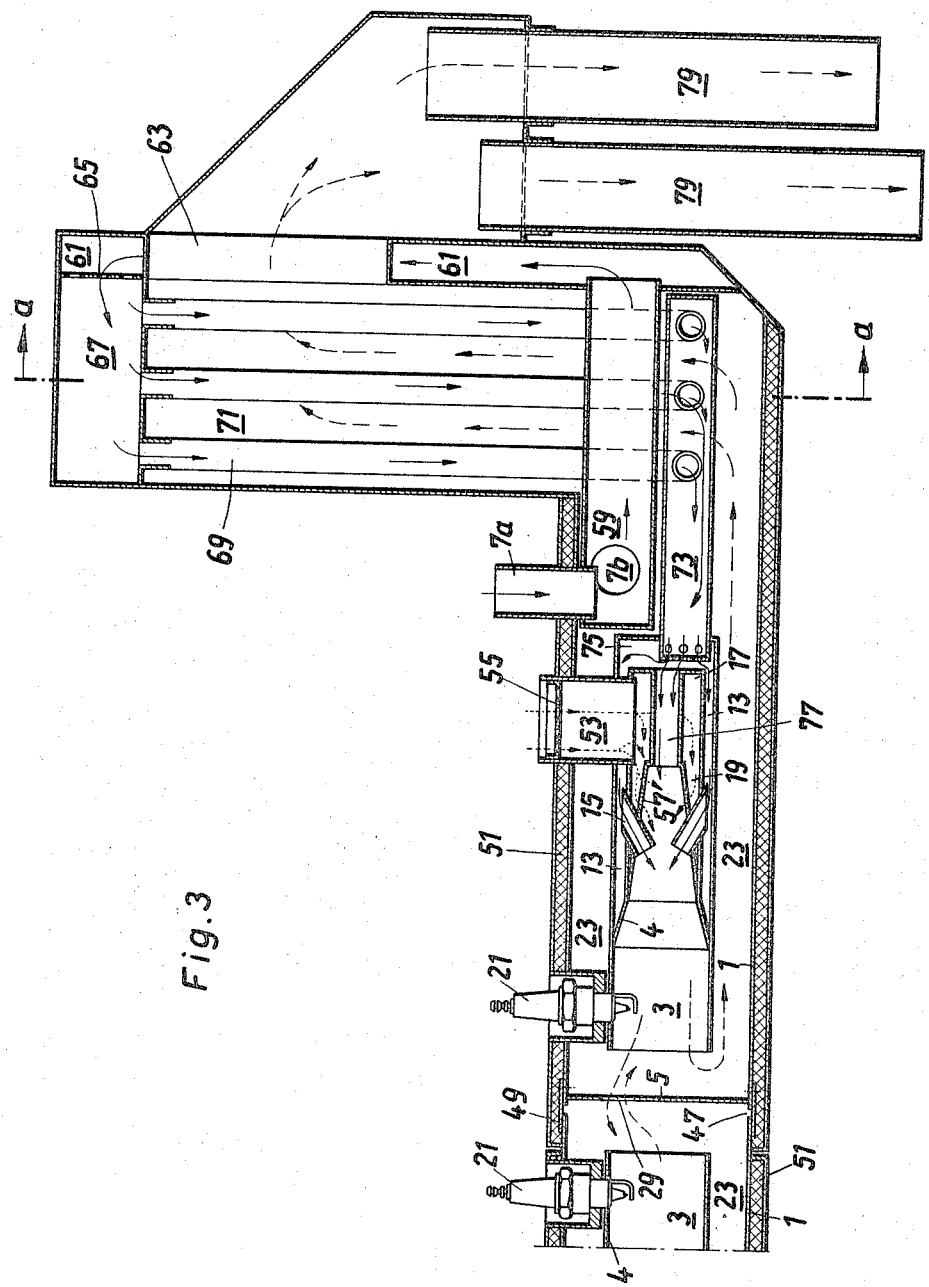
Figure 4:
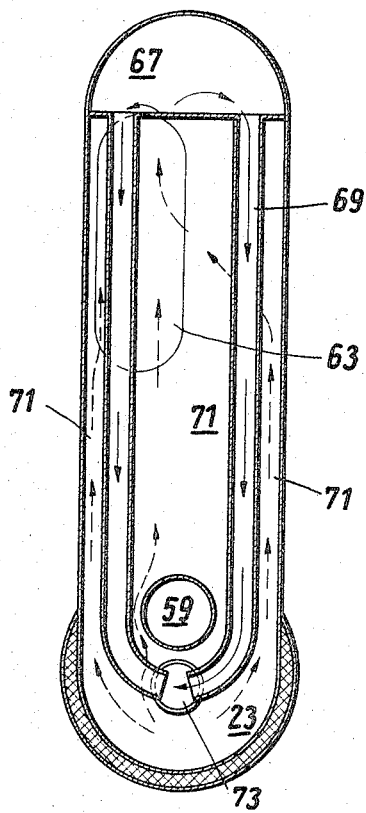
FIG. 4 is a sectional view taken on line a—a in FIG. 3.

In the embodiments described hereinbefore there is a common exhaust gas supply conduit 7 for the exhaust gases from all cylinders of the internal combustion engine. The embodiment shown in FIGS. 3 and 4 has separate exhaust gas supply conduits 7a, each of which is associated with two cylinders of an opposed cylinder-type engine. Only the right-hand half and a small part of the left-hand half of the afterburning apparatus are shown. The common shell 1 is interrupted at 47. The right-hand portion of the shell 1 carries the common vibration reflecting wall 5 and a cylindrical ring 49, which is slidable on the right-hand end of the left-hand shell to enable an equalization of temperature-induced stresses. The shell 1 of both halves is insulated by an asbestos layer 51 resisting a dissipation of heat.

The common vibration reflecting wall 5 has an aperture 29 between those portions of the igniting plugs 21 which extend into the air admixing and combustion chambers 3. An imaginary straight line connecting these portions extends through the aperture 29 and is parallel to the axis of the tubes 4.

Supplemental air is supplied through a pipe connection 53, the outer end of which is covered by a sieve plate 55. The air is supplied to the air admixing and combustion chamber 3 through the above-described chambers 17 and 19 and through wall apertures 57.

The exhaust gases from one half of the cylinders of the opposed cylinder-type engine flow through the supply ducts 7a and 7b and are received first by a heat exchanger, where they take up heat energy from the afterburnt exhaust gases. The exhaust gases are conducted downwardly in a pipe 59 and then upwardly in a well 61, which surrounds an aperture 63 for the passage of the afterburnt exhaust gases. The top end of the well 61 is connected through openings 65 to a chamber 67. Six tubes from this chamber extend through an outlet well 71 for the afterburnt exhaust gases into a pipe 73, which conducts the exhaust gases into a chamber 75. From this chamber, the exhaust gases flow into the above-described shell chamber 13 and from the latter through pipes 15 into the air admixing and combustion chamber 3. An axial duct 77 leads directly from the chamber 75 into the air admixing and combustion chamber 3.

The afterburnt exhaust gases flow from the extension 23 of the combustion chamber into the outlet well 71 and through the aperture 63 into outlet pipes 79.

The exhaust gases which are supplied flow along a long path in parallel counterflow relation to the afterburnt exhaust gases. If the pipe 59 is disregarded, the supplied exhaust gases enter into a heat exchange in the pipes 69 with considerably cooled afterburnt exhaust gases and then while flowing to the chamber 13 enter into a heat exchange with afterburnt exhaust gases at increasing temperatures.

Figure 5:
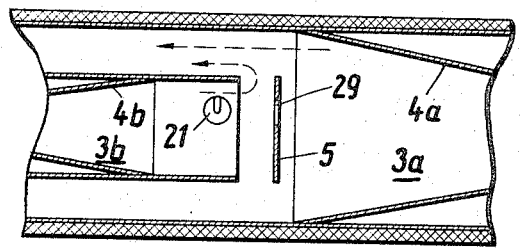
FIGS. 5 and 6 are longitudinal sectional views showing afterburning apparatus which comprise two units differing size.
Figure 6:
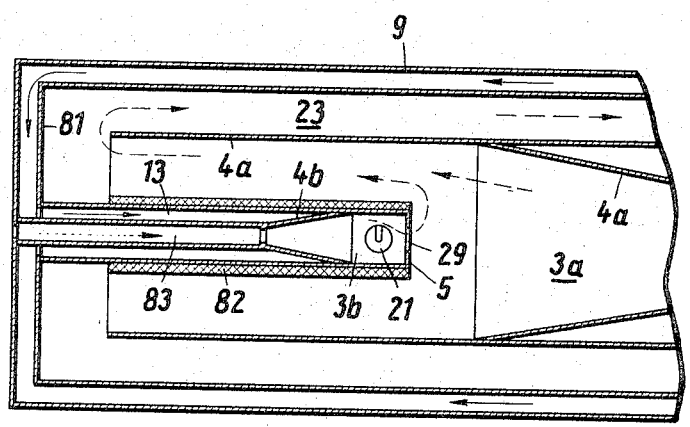

The embodiments shown in FIGS. 5 and 6 comprise air admixing and combustion chambers differing in size. A small, left-hand air admixing and combustion chamber 3b is disposed within a large, right-hand combustion and air chamber 3a. The means for supplying exhaust gases and supplemental air to the air admixing and combustion chambers in FIG. 5 and to the right-hand air admixing and combustion chamber in FIG. 6 is designed as shown in any of FIGS. 1 to 3. Only a single igniting plug 21 is provided in both for air admixing and combustion chambers, and is disposed in the smaller air admixing and combustion chamber 3b. The vibration reflecting wall 5 has only a size corresponding to the diameter of the outlet end of the smaller tube 4bx and has an aperture 29, through which the igniting plug 21 extends. In the embodiment of FIG. 5, the wall 5 is held by webs, not shown.

In FIG. 5, the left-hand portion of the air admixing and combustion chamber 3a serves as an extension of the left-hand air admixing and combustion chamber 3b. The same applies to FIG. 6, where the chamber 3a is continued by a further extension 23, which receives the afterburnt exhaust gases from both air admixing and combustion chambers after a reversal of flow. The air admixing and combustion chamber 3a and the chamber 3b are provided with a common vibration reflecting wall 5. The chamber 3a is further provided with a vibration reflecting wall 81, where the combined gas flows of both chambers are reversed.

According to FIG. 6, the air admixing and combustion chamber 3b and the means for supplying exhaust gases thereto are provided with a heat insulating asbestos layer 82. The exhaust gases are supplied through the hollow cylindrical chamber 9, which surrounds the extension 23 of the combustion chamber. From chamber 9, the exhaust gases flow in known manner through a hollow-cylindrical duct 13 into the air admixing and combustion chamber 3b whereas the supplemental air is supplied through an axial duct 83.

In the embodiment shown in FIG. 6, a single cylinder of the internal-combustion engine may be connected to the air admixing and combustion chamber 3b whereas the exhaust gases from all other cylinders are supplied to the chamber 3a. In this case the chamber 3b as a whole constitutes an igniting element for the chamber 3a. In this case the aperture 29 is large relative to the diameter of the wall 5. The wall forms substantially a ring in the aperture of which the velocity of the flame is highly increased in known manner. An accelerated flame tongue jets through the aperture and can ignite the larger gas volume in chamber 3a at a high velocity.

Figure 7:
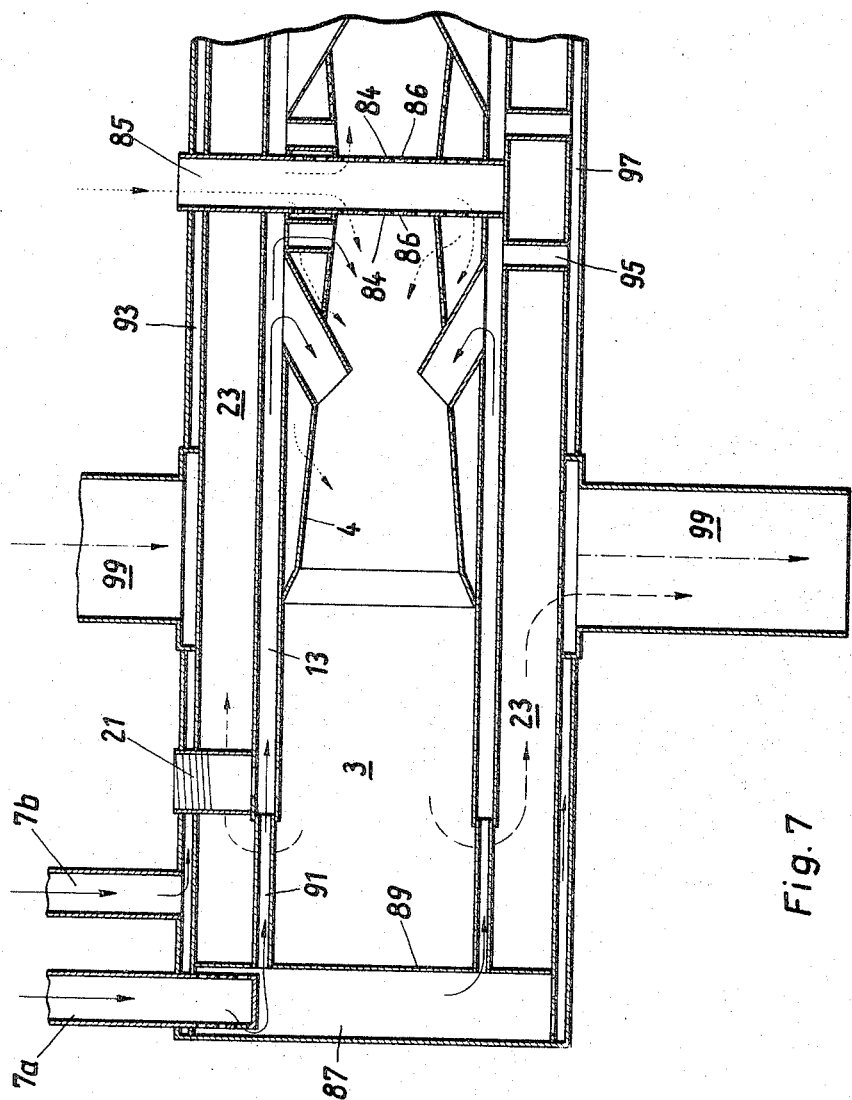
FIG. 7 is a longitudinal sectional view showing afterburner units which have confronting inlet chambers.

In the embodiment of FIG. 7, the upstream vibration reflecting walls 84 of two air admixing and combustion chambers 3 adjoin a common air inlet chamber 85. Apertures 86 in the walls serve both for supplying air and for an equalization of pressure between the two air admixing and combustion chambers 3. The exhaust gases are separately supplied to both air admixing and combustion chambers. This is illustrated only for the left-hand afterburner unit. Part of the exhaust gases flow from the exhaust gas supply duct 7a into a preheating chamber 87, one wall of which is the vibration reflecting wall 89 associated with the air admixing and combustion chamber 3. From chamber 87, the exhaust gases flow through ducts 91 into the above-described chamber 13, which surrounds the air admixing and combustion chamber 3.

Another part of the exhaust gases is supplied to the left-hand system and flows through a supply duct 7b into a cylindrical jacket chamber 93, which surrounds the extension 23 of the combustion chamber to prevent an excessive heating of the outside surface of the afterburner. Cross-connections 95 are provided between the cylindrical exhaust gas chambers 13 and 93. Besides, the chambers 93 of both systems merge at 97 so that an additional equalization of pressure between the two systems is provided for.

The exhaust gases escape into the open from the extension 23 of the combustion chamber of each system through a blower duct 99. The direction of flow of the blower air is indicated by dash-dot arrows.

Figure 8:
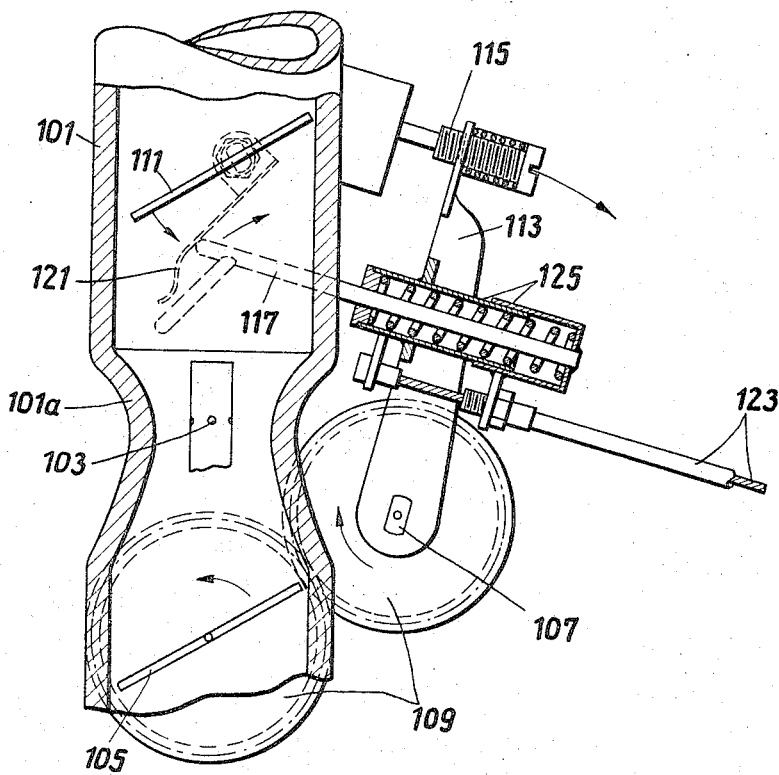
FIG. 8 is a sectional view illustrating the damper control according to the invention.

FIG. 8 is a longitudinal sectional view of the mixture intake conduit 101 of a gasoline or petrol engine. The exhaust gases from this engine are afterburnt in any of the afterburners which have been described hereinbefore. This conduit has a venturi tube portion 101a. The gasoline or petrol outlet openings 103 are provided at the throat of the venturi tube. Under the throat, the main throttle valve 105 is provided in the conduit 101. This valve 105 can be opened or closed by means of the throttle lever, not shown, to cause fuel-air mixture to be supplied to the engine at a higher or lower rate. The throttle lever is pivoted on a shaft 107 and its movement is transmitted by two gears 109 to the main throttle valve 105. These gear wheels are shown on the drawing mainly to enable a clearer representation. They may be omitted in different geometrical arrangements.

The above-mentioned damper 111 is provided on a higher level in the conduit 101. A spiral spring, not shown, tends to open the damper.

The shaft 107 is rotatable by means of the throttle lever and has an arm 113 non-rotatably secured to it. The arm 113 is provided at its free end with a stop screw 115 for setting the idling position of the main valve. A pin 117 is pivotally movable in unison with the arm 113 and has a forked forward end, which is disposed behind the mixture intake conduit 101 and bears on a tongue 121, which is mounted outside the conduit 101 and non-rotatably connected to the shaft of the damper valve. When the shaft 107 is operated in the direction of the arrow to open the main valve 105 further, the pin 117 is moved at the same time in the direction of the arrow and the damper 111 is further opened. As a result, the damper has the greatest throttling effect when the stop screw 115 is engaged and the engine is idling. This arrangement is of no significance for the idling condition, which is taken care of by separate nozzles or carburetor positions. The additional damper action is important to prevent an extinction of the afterburner during partial-load operation and when the speed of the internal-combustion engine is frequently changed.

The exact course of the opening movement of the damper in relation to the opening movement of the main valve 105 can be adjusted as desired by a suitable design of the tongue 121 and of the fork of the pin 117.

The damper is not only adjustable in response to a movement of the main valve but is independently adjustable by a Bowden cable 123, which acts on a spring sleeve 125, which can be reduced in length so that the pin 117 can be displaced relative to the arm 113. The other end, not shown, of the Bowden cable, may be controlled by a temperature sensing element, which is disposed in or close to an air admixing and combustion chamber of the afterburning apparatus. A high temperature causes the temperature sensing element to open the damper further and vice versa. The Bowden cable may also be adjustable by hand.

What we claim is:

1. Apparatus for a noncatalytic afterburning of exhaust gases of internal-combustion engines, comprising a common shell, a number of afterburner units accommodated in said shell, each of said afterburner units comprising tube means defining an axial flow path, said flow path comprising a combustion chamber, supply means for supplying exhaust gases to said combustion chamber, and vibration reflecting wall means defining vibration reflecting surfaces which are confining said combustion chambers, one of said vibration reflecting surfaces associated with one of said units and one of said vibration reflecting surfaces associated with the other of said units being disposed adjacent to and facing away from each other.

2. Apparatus as set forth in claim 1, in which said vibration reflecting surfaces are disposed upstream and downstream of each of said combustion chambers.

3. Apparatus as set forth in claim 1, in which said supply means comprises a common heat exchange wall exposed to the interior of said combustion chamber and of said supply means.

4. Apparatus as set forth in claim 1, said apparatus further comprising extension means defining at least one combustion chamber extension portion disposed downstream of and communicating with at least one of said combustion chambers.

5. Apparatus as set forth in claim 1 wherein sound damping means are provided in each of said afterburner units.

6. Apparatus as set forth in claim 1, in which said vibration reflecting wall means comprise a wall which is formed on one side with a vibration reflecting surface associated with one of said units and on the other side with a vibration reflecting surface associated with the other of said units.

7. Apparatus as set forth in claim 1 in which said vibration reflecting wall means comprise two spaced apart parallel walls, each of said walls being formed on the surface thereof which is opposite to the other of said walls with one of said vibration reflecting surfaces, said vibration reflecting surfaces of said walls being associated with different ones of said units.

8. Apparatus as set forth in claim 2, in which one of said upstream vibration reflecting surfaces associated with one of said units and one of said upstream vibration reflecting surfaces associated with the other of said units are disposed adjacent to and face away from each other.

9. Apparatus as set forth in claim 2, in which one of said downstream vibration reflecting surfaces associated with one of said units and one of said downstream vibration reflecting surfaces associated with the other of said units are disposed adjacent to and face away from each other.

10. Apparatus as set forth in claim 1, in which said shell consists of a ring tube.

11. Apparatus as set forth in claim 1, in which said vibration reflecting wall means are formed with at least one aperture establishing a communication between said combustion chambers and extending through said one vibration reflecting surface associated with said one unit and said one vibration reflecting surface associated with said other unit.

12. Apparatus as set forth in claim 1 in which said tube means of both said units have axes which are aligned with each other.

13. Apparatus as set forth in claim 2, in which said vibration reflecting wall means comprise a wall which is formed on one side with the downstream vibration reflecting surface associated with one of said units and on the other side with the downstream vibration reflecting surface associated with the other of said units, said wall is formed with an aperture, and igniting mean comprising an igniting portion lying on an imaginary straight line which is parallel to the axis of one of said tube means and extends through said aperture.

14. Apparatus as set forth in claim 13, in which said igniting means comprises an igniter only in said main combustion chamber of one of said units.

15. Apparatus as set forth in claim 13, in which said igniting means comprises an igniter which is common to both said units and disposed within said aperture.

16. Apparatus as set forth in claim 2, in which said vibration reflecting wall means comprise a wall which is formed one one side with the downstream vibration reflecting surface associated with one of said units and on the other side with the downstream vibration reflecting surface associated with the other of said units, said wall is formed with an aperture, said shell comprises two separate parts overlapping adjacent to said vibration reflecting wall to form an expansion joint, and said vibration reflecting wall is secured only to one of said parts.

17. Apparatus as set forth in claim 1, in which said combustion chambers differ in size.

18. Apparatus as set forth in claim 17, in which said tube means of one of said unit is coaxially disposed within the combustion chamber of the other unit.

19. Apparatus as set forth in claim 1, in which said supply means define a chamber which surrounds said combustion chamber extension portions.

20. Apparatus as set forth in claim 1, in which said supply means define a chamber and which comprises means defining ducts which are disposed downstream of and communicate with said combustion chamber extension portions and extend through said chamber defined by said supply means.

21. An internal combustion engine which comprises a plurality of cylinders, and is provided with apparatus for a noncatalytic afterburning of exhaust gases of internal-combustion engines, comprising a common shell, two afterburner units accommodated in said shell, each of said afterburner units comprising tube means defining an axial flow path, said flow path comprising a combustion chamber and vibration reflecting wall means defining vibration reflecting surfaces which are disposed upstream and downstream of each of said combustion chambers, respectively, one of said vibration reflecting surfaces associated with one of said units and one of said vibration reflecting surfaces associated with the other of said units being disposed adjacent to and facing away from each other said supply means constituting separate first and second flow paths, said first flow path connecting at least one of said cylinders to one of said units, said second flow path connecting the remaining cylinders to the other of said units.

22. An internal-combustion engine which comprises at least three cylinders and is provided with apparatus for a noncatalytic afterburning of exhaust gases of internal-combustion engines, comprising a common shell, two afterburner units accommodated in said shell, each of said afterburner units comprising tube means defining an axial flow path, said flow path comprising a combustion chamber and vibration reflecting wall means defining vibration reflecting surfaces which are confining each of said combustion chambers, respectively, said combustion chambers differing in size, said supply means constituting first and second flow paths, said flow paths connecting only one of said cylinders to the smaller of said combustion chambers, said second flow path connecting the remaining cylinders to the other of said units, said smaller combustion chamber being surrounded by heat insulation.

23. An internal-combustion engine having a predetermined total displacement volume and provided with apparatus for a noncatalytic afterburning of exhaust gases of internal-combustion engines, comprising a common shell, two afterburner units accommodated in said shell, each of said afterburner units comprising tube means defining an axial flow path, said flow path comprising a combustion chamber and vibration reflecting wall means defining vibration reflecting surfaces which are disposed upstream and downstream of each of said combustion chambers, respectively, one of said vibration reflecting surfaces associated with one of said units and one of said vibration reflecting surfaces associated with the other of said units being disposed adjacent to and facing away from each other, said downstream vibration reflecting surfaces defining flow reversing regions, the total cubic capacity of said combustion chambers, inclusive of said flow reversing regions, being smaller than said total displacement volume.

24. An internal-combustion engine as set forth in claim 23, in which extension means are defining at least one combustion chamber extension portion disposed downstream of and communicating with said combustion chambers, said flow reversing regions are disposed between said combustion chambers and said combustion chamber extension portions and the total cubic capacity of said combustion chambers, inclusive of said flow reversing regions, and of said combustion chamber extension portions, is five to eight times said total displacement volume.

25. An internal-combustion engine having a fuel intake conduit, a main control valve in said fuel intake conduit, a damper in said fuel intake conduit, and means for moving said damper in response to and in the same sense as a movement of said main control valve, said engine being provided with apparatus for a noncatalytic afterburning of exhaust gases of internal-combustion engines, comprising a common shell, two afterburner units accommodated in said shell, each of said afterburner units comprising tube means defining an axial flow path, said flow path comprising a unitary air admixing and combustion chamber, said unitary chamber having an upstream inlet chamber portion and a downstream main combustion chamber portion, each of said tube means being formed with separate inlets for exhaust gases and supplemental air, respectively, in direct communication with said inlet chamber portion, said apparatus further comprising extension means defining at least one combustion chamber portion disposed downstream of and communicating with said combustion chambers, supply means for supplying exhaust gases to said inlets for exhaust gases, said extension and supply means comprising a common heat exchange wall exposed to the interior of said combustion chamber extension portion and of said supply means, sound damping means in each of said afterburner units igniting means in said main combustion chamber portions, and vibration reflecting wall means defining vibration reflecting surfaces which are disposed upstream and downstream of each of said unitary chambers, respectively, said engine further comprising temperature sensing elements responsive to the temperature of said apparatus, and means for moving said damper in response to the temperature sensed by said temperature sensing means.

26. An internal-combustion engine as set forth in claim 25, which comprises a linkage arranged to provide for a predetermined functional relationship between the temperature sensed by said temperature sensing means and the free cross-section at said damper, said linkage comprising a slider operable by said temperature sensing means in response to changes of the temperature sensed thereby, and a curved, spring-loaded tongue which is connected for rotation with said damper and engaged and pivotally movable by said slider.

References Cited

UNITED STATES PATENTS

| 3,184,400 | 5/1965 | Magnus. | |
| 3,201,338 | 8/1965 | Pennington | 60—30 X |
| 3,254,484 | 6/1966 | Kopper | 60—29 X |
| 3,285,709 | 11/1966 | Ennarino | 60—30 X |

CARLTON R. CROYLE, *Primary Examiner.*

R. D. BLAKESLEE, *Assistant Examiner.*